US009213180B2

(12) United States Patent
Choi et al.

(10) Patent No.: US 9,213,180 B2
(45) Date of Patent: *Dec. 15, 2015

(54) ELECTROWETTING DISPLAY DEVICE

(71) Applicant: Amazon Technologies, Inc., Reno, NV (US)

(72) Inventors: Byungseok Choi, Seoul (KR);
Seung-Jin Baek, Suwon-si (KR);
Taimei Kodaira, Hwaseong-si (KR);
JiEun Lee, Seoul (KR); Hyeon Gu Cho, Yongin-si (KR)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,878

(22) Filed: Jun. 9, 2014

(65) Prior Publication Data

US 2014/0285870 A1    Sep. 25, 2014

Related U.S. Application Data

(63) Continuation of application No. 13/742,115, filed on Jan. 15, 2013, now Pat. No. 8,749,865.

(30) Foreign Application Priority Data

May 11, 2012 (KR) ........................ 10-2012-0050425

(51) Int. Cl.
*G02B 26/02* (2006.01)
*G09G 3/34* (2006.01)
*G02B 26/00* (2006.01)

(52) U.S. Cl.
CPC .............. *G02B 26/005* (2013.01); *G02B 26/02* (2013.01); *G09G 3/348* (2013.01)

(58) Field of Classification Search
CPC ....... G02B 26/005; G02B 26/02; G09G 3/348
See application file for complete search history.

(56) References Cited

U.S. PATENT DOCUMENTS

| 7,812,809 | B2 | 10/2010 | Choi et al. |
| 7,876,506 | B2 | 1/2011 | Chen et al. |
| 7,993,819 | B2 | 8/2011 | Lo et al. |
| 8,081,389 | B2 | 12/2011 | Kirita et al. |
| 8,264,778 | B2 | 9/2012 | Kim et al. |
| 8,749,865 | B2 * | 6/2014 | Choi et al. ................... 359/228 |
| 2009/0051633 | A1 | 2/2009 | Yan et al. |

(Continued)

FOREIGN PATENT DOCUMENTS

| JP | 2002055286 A | 2/2002 |
| JP | 2008055666 A | 3/2008 |

(Continued)

*Primary Examiner* — David N Spector
(74) *Attorney, Agent, or Firm* — Lee & Hayes, PLLC

(57) ABSTRACT

An electrowetting display device includes a first base substrate, a plurality of first electrodes disposed on the first base substrate and positioned to respectively correspond to positions of a plurality of pixels, a partition wall disposed on the first base substrate to partition the pixels, a second electrode disposed on the partition wall and including a plurality of openings, a second base substrate facing the first base substrate, and an electrowetting layer disposed between the first base substrate and the second base substrate, the electrowetting layer respectively being moved by voltages respectively applied to the first electrode and the second electrode.

20 Claims, 12 Drawing Sheets

(56) References Cited

U.S. PATENT DOCUMENTS

| | | |
|---|---|---|
| 2011/0209998 A1 | 9/2011 | Shenderov |
| 2011/0235146 A1 | 9/2011 | Feil et al. |
| 2012/0019523 A1 | 1/2012 | Lee et al. |
| 2013/0208331 A1 | 8/2013 | Kim et al. |
| 2013/0301108 A1 | 11/2013 | Lim et al. |
| 2013/0329274 A1 | 12/2013 | Yang et al. |
| 2014/0029080 A1 | 1/2014 | Hwang |

FOREIGN PATENT DOCUMENTS

| | | |
|---|---|---|
| KR | 1020080041483 A | 5/2008 |
| KR | 1020090021425 A | 3/2009 |
| KR | 1020110071276 A | 6/2011 |
| KR | 1020110109599 A | 10/2011 |
| WO | WO2006000945 A1 | 1/2006 |

* cited by examiner

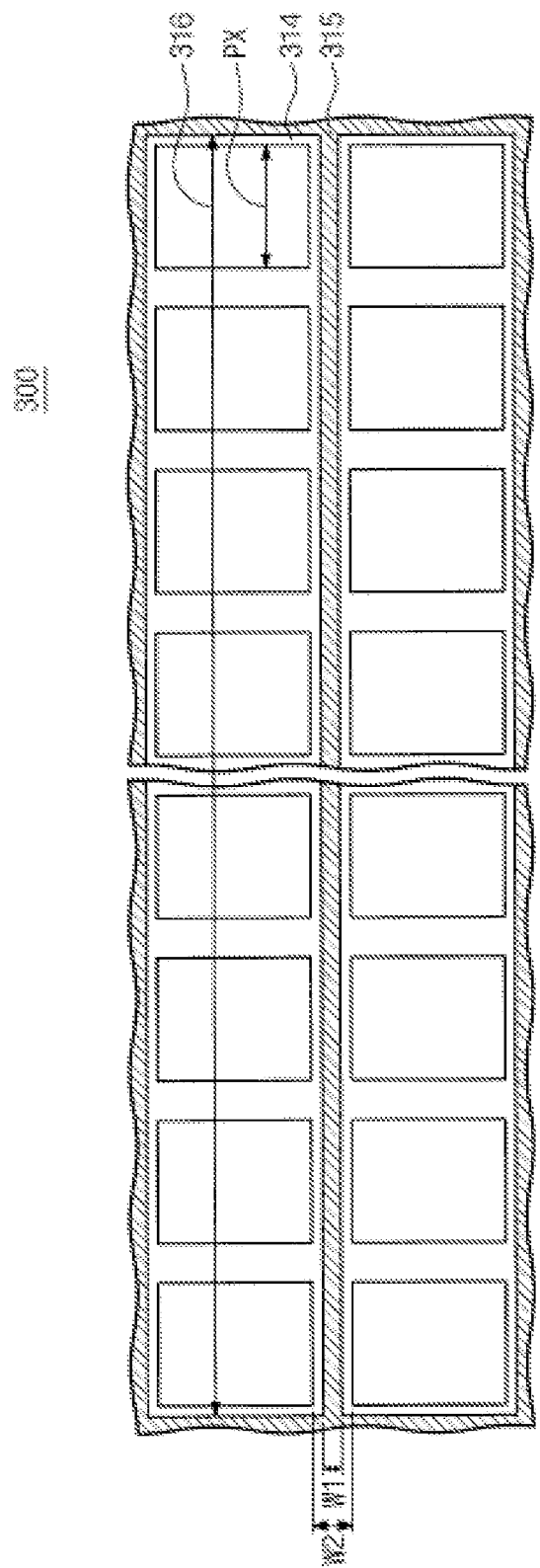

ELECTROWETTING DISPLAY DEVICE

CROSS-REFERENCE TO RELATED APPLICATION

The present disclosure is a continuation of and claims priority to U.S. patent application Ser. No. 13/742,115, filed Jan. 15, 2013, now U.S. Pat. No. 8,749,865, issued Jun. 10, 2014, which claims priority under 35 U.S.C. §119 of Korean Patent Application No. 10-2012-0050425, filed May 11, 2012, which are incorporated herein by reference.

BACKGROUND

1. Field of Disclosure

The present disclosure relates to an electrowetting display device. More particularly, the present disclosure relates to an electrowetting display device capable of improving transmittance.

2. Description of the Related Art

Recently, various display devices, such as a liquid crystal display, an organic light emitting diode, an electrowetting display device, a plasma display panel, electrophoretic display device, etc., have been developed.

Among these, the electrowetting display device has been spotlighted as a next generation display device because the electrowetting display device has various properties, e.g., low power consumption, fast response speed, high visibility, etc., when compared to the liquid crystal display.

In general, electrowetting display devices are classified into transmission type electrowetting display devices and reflection type electrowetting display devices. Electrowetting display devices generally include a first substrate, a second substrate facing the first substrate, and an electrowetting layer disposed between the first and second substrates. The first substrate includes a plurality of pixel electrodes respectively corresponding to a plurality of pixels, and the second substrate includes a common electrode formed in a single body. The reflection type electrowetting display device further includes a reflective layer to reflect light. Movement of the electrowetting layer is controlled by voltages respectively applied to first and second electrodes of the electrowetting display device, and thus an image is displayed in the electrowetting display device.

In the transmission electrowetting display device, the light passes through the second substrate after passing through the first substrate and the electrowetting layer. In the reflection electrowetting display device, the light passing through the first substrate and the electrowetting layer is reflected by a reflective layer, and the reflected light passes through the first substrate again. Accordingly, light passes through the first substrate once in the case of the transmission type electrowetting display device and passes through the first substrate twice in the case of the reflection type electrowetting display device.

An improvement of the electrowetting display device is required.

SUMMARY

The present disclosure provides an electrowetting display device capable of improving transmittance.

An electrowetting display device includes a first base substrate, a plurality of first electrodes disposed on the first base substrate each positioned to correspond, respectively, to a position of one of a plurality of pixels, a partition wall disposed on the first base substrate to partition the pixels, a second electrode disposed on the partition wall and including a plurality of openings, a second base substrate facing the first base substrate, and an electrowetting layer disposed between the first base substrate, the electrowetting layer being moved by voltages applied to the first electrode and the second electrode.

The second electrode has a width between two openings adjacent to each other equal to or smaller than a width of the partition wall between two pixels adjacent to each other.

The first base substrate includes a display area and a non-display area, the display area includes the partition wall and the second electrode disposed on the partition wall, and the non-display area includes a common voltage line disposed on the first base substrate and a third electrode disposed on an outermost side surface of the partition wall to electrically connect the second electrode and the common voltage line.

The non-display area further includes an insulating layer disposed on the first base substrate to cover the common voltage line, and a connection electrode electrically connected between the third electrode and the common voltage line through a contact hole formed through the insulating layer.

The third electrode has a height corresponding to a distance between an upper surface of the insulating layer and an upper surface of the second electrode to make contact with the second electrode.

The third electrode and the second electrode include the same transparent conductive material.

The openings are respectively positioned correspond to the position of the pixels.

The pixels are arranged in n rows by m columns, and the openings of the second electrode respectively correspond to pixel units each including two or more, but less than m, pixels arranged in each row.

The openings respectively correspond to the pixel units each including two pixels arranged in each row.

The openings respectively correspond to the pixel units each including three pixels arranged in each row.

The openings respectively correspond to the pixel units each including m pixels arranged in each row.

The pixels are arranged in n rows by m columns, and the openings of the second electrode respectively correspond to pixel units each including the pixels arranged in two rows by two or more but m or less columns.

The openings respectively correspond to the pixel units each including four pixels arranged in two rows by two columns.

The openings respectively correspond to the pixel units each including six pixels arranged in two rows by three columns.

The openings respectively correspond to the pixel units each including the pixels arranged in two rows by m columns.

According to the above, the electrowetting display device may improve the transmittance of the light.

BRIEF DESCRIPTION OF THE DRAWINGS

The above and other advantages of the present invention will become readily apparent by reference to the following detailed description when considered in conjunction with the accompanying drawings wherein:

FIGS. 7A to 7C are plan views showing an electrowetting display device according to a third exemplary embodiment.

DETAILED DESCRIPTION

Hereinafter, exemplary embodiments will be explained in detail with reference to the accompanying drawings.

Figure 1:
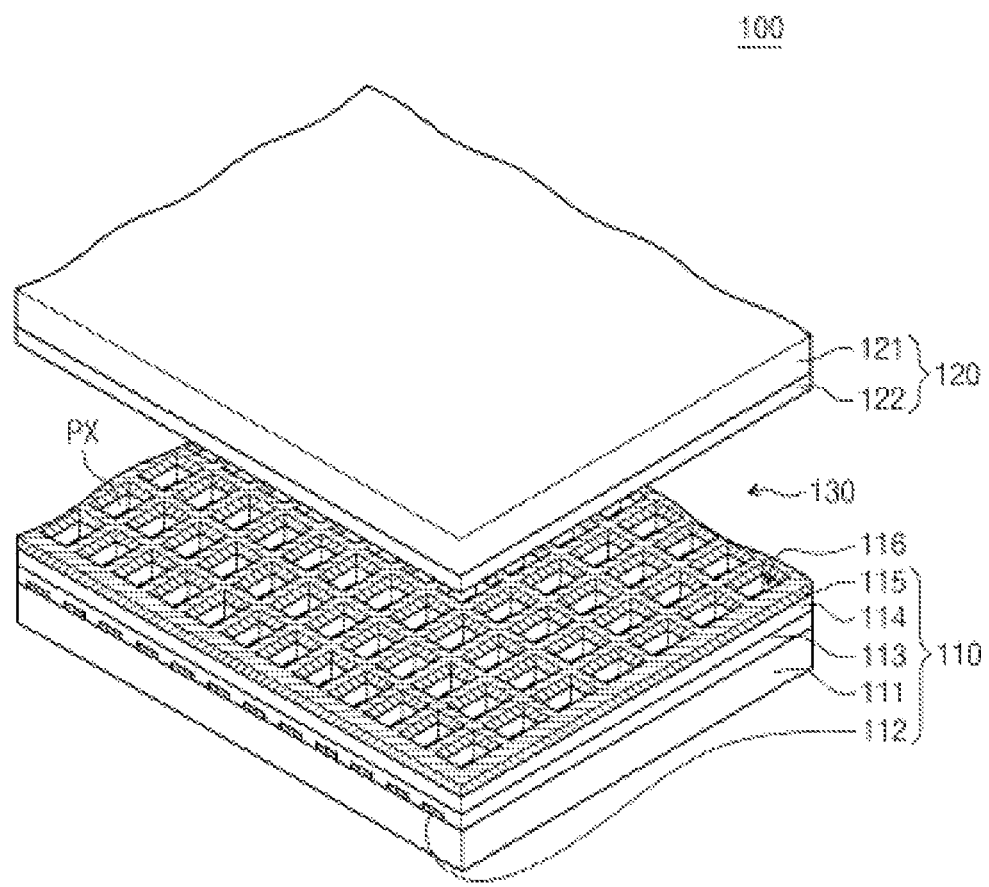
FIG. 1 is a perspective view showing an electrowetting display device according to a first exemplary embodiment.

FIG. 1 is a perspective view showing an electrowetting display device according to a first exemplary embodiment.

Referring to FIG. 1, an electrowetting display device 100 includes a first substrate 110, a second substrate 120 facing the first substrate 110, and an electrowetting layer 130 disposed between the first and second substrates 110 and 120.

The first substrate 110 includes a first base substrate 111, a plurality of first electrodes 112 disposed on the first base substrate 111, an insulating layer 113 disposed on the first base substrate 111 to cover the first electrodes 112, a partition wall 114 disposed on the insulating layer 113 to partition a plurality of pixels PX, and a second electrode 115 disposed on the partition wall 114.

The first electrodes 112 are positioned respectively to correspond to the positions of the pixels PX and include a transparent conductive material, such as an indium tin oxide (ITO), a conductive polymer, a carbon nanotube (CNT), etc. The first electrodes 112 may be defined as pixel electrodes.

The insulating layer 114 is surface-treated to have a hydrophobic property or includes an additional hydrophobic layer (not shown) to impart a hydrophobic property to the layer.

The partition wall 115 is formed of photoresist or formed by patterning the insulating layer, e.g., SiNx, SiOx, etc.

The second electrode 115 is formed to make contact with an upper surface of the partition wall 114 and includes a plurality of openings 116 positioned respectively corresponding to the positions of pixels PX. That is, the openings 116 are over the area that includes the first electrodes in each pixel PX. The openings 116, in which the material used for the second electrode 115 is not formed, will be described in more detail with reference to FIGS. 3A and 3B.

The second electrode 115 has a width corresponding to the distance between two openings adjacent to each other. The partition wall 114 has a width corresponding to the distance between two pixels adjacent to each other.

The second electrode 115 may be formed to have the same width as the partition wall 114. That is, the second electrode 115 is patterned together with the partition wall 114 using the same mask used to form the partition wall 114. The second electrode 115 is applied with a common voltage and formed of a transparent conductive material, such as indium tin oxide (ITO). In addition, the second electrode 115 may be referred to as a common electrode.

The pixels PX are arranged in n rows by m columns. Each of "m" and "n" is an integer number greater than zero (0). The pixels PX are configured to include a red pixel, a green pixel, and a blue pixel. The red, green, and blue pixels are regularly repeatedly arranged in a row direction and a column direction. However, the arrangement of the pixels PX should not be limited thereto or thereby.

The second substrate 120 includes a second base substrate 121 facing the first base substrate 111 and a color filter CF 122 formed on the second base substrate 121. The color filter CF includes a color pixel representing a red, green, or blue color. In the present exemplary embodiment, the color filter 122 is included in the second substrate 120, but the color filter 122 may be included in the first substrate 110.

The first and second base substrates 111 and 121 may be a transparent insulator and formed of a polymer, e.g., glass or plastic. In the case that the first and second base substrates 111 and 121 are plastic substrates, each of the first and second base substrates 111 and 121 is configured to include, for example, polyethylene terephthalate (PET), fiber reinforced plastic (FRP), or polyethylene naphthalate (PEN). In addition, when each of the first and second base substrates 111 and 121 is a plastic substrate, the first and second base substrates 111 and 121 may be flexible.

The electrowetting layer 130 includes a first fluid and a second fluid, which are immiscible with each other. The first fluid has electrical non-conductivity or non-polarity and the second fluid has electrical conductivity or polarity. The movement of the electrowetting layer 130 is controlled in each pixel by a gray-scale voltage applied to the first electrode 112 and the common voltage applied to the common electrode 122, and thus a desired image is displayed through the electrowetting display device 100. The operation of the pixels will be described with reference to FIGS. 3A and 3B.

In a conventional electrowetting display device in which a second electrode is formed having a single, uniform body on the second base substrate, a portion of the light incident onto the display device may not transmit through such a second electrode. That is, transmittance of light is lowered by the second electrode. However, in the electrowetting display device 100, the second electrode 115 includes the openings 116 respectively corresponding to the pixels PX and is formed on the partition wall 114. Because the material used to form the second electrode 115 is not formed in the openings 116, the light passes through the openings 116. Accordingly, the electrowetting display device 100 according to the first exemplary embodiment may improve the transmittance of the light.

In addition, because the second electrode 115 is formed on the partition wall 114 without being formed on the second base substrate 121, a process of forming the second substrate 120 may be simplified. The second electrode 115 is formed to have the same width as the partition wall 114 and is patterning together with the partition wall 14 using the same mask. Thus, no additional mask is required when the second electrode 115 is formed.

Figure 2:
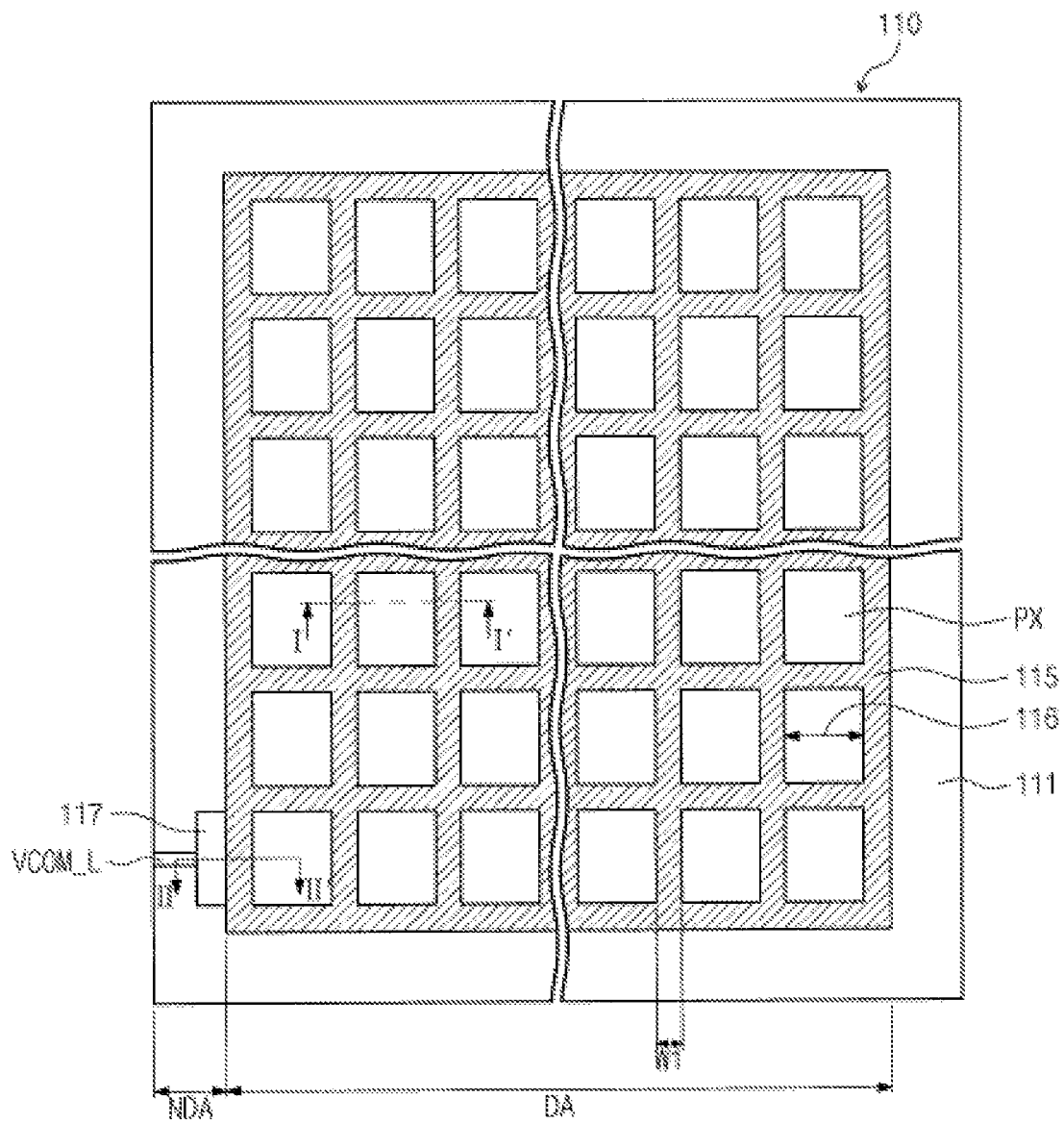
FIG. 2 is a plan view showing the electrowetting display device shown in FIG. 1.

FIG. 2 is a plan view showing the electrowetting display device shown in FIG. 1.

FIG. 2 shows only the plan configuration of the first substrate 110 to explain the plan configuration of the second electrode 115 formed on the partition wall 114.

Referring to FIG. 2, the first substrate 110 includes a display area DA and a non-display area NDA. The display area DA and the non-display area NDA may be vertically divided. Therefore, the first base substrate 111 of the first substrate 110 may include the display area DA and the non-display area NDA.

The display area DA includes the partition wall 114 that partitions the pixels PX and the second electrode 115 disposed on the partition wall 114. In detail, the partition wall 114 is disposed on the first base substrate 111 of the display area DA, and the second electrode 115 including the openings 116 is disposed on the partition wall 114. As described above, the pixels PX partitioned by the partition wall 114 are disposed in the display area DA. The openings 116 are positioned to correspond to the position of the pixels PX, respectively.

As described above, the width W1 of the second electrode 115 corresponds to the width between the two openings 116 adjacent to each other. Because the width of the partition wall 114 is equal to the width W1 of the second electrode, only the second electrode 115 can be seen in the plan configuration view shown in FIG. 2.

The pixels PX are partitioned by the partition wall 114, and the second electrode 115 has the same width as the width of the partition wall 114, and thus the width of the openings and the width of the pixels PX may be the same, as shown in the plan configuration view.

The non-display area NDA includes a common voltage line VCOM_L disposed on the first base substrate 111 and a third electrode 117 disposed at outermost side of the partition wall 114 to electrically connect the second electrode 115 and the common voltage line VCOM L. Accordingly, the common voltage may be applied to the second electrode 115. The third electrode 117 disposed at the outermost side of the partition wall 114 will be described with reference to FIG. 4.

Figure 3A:
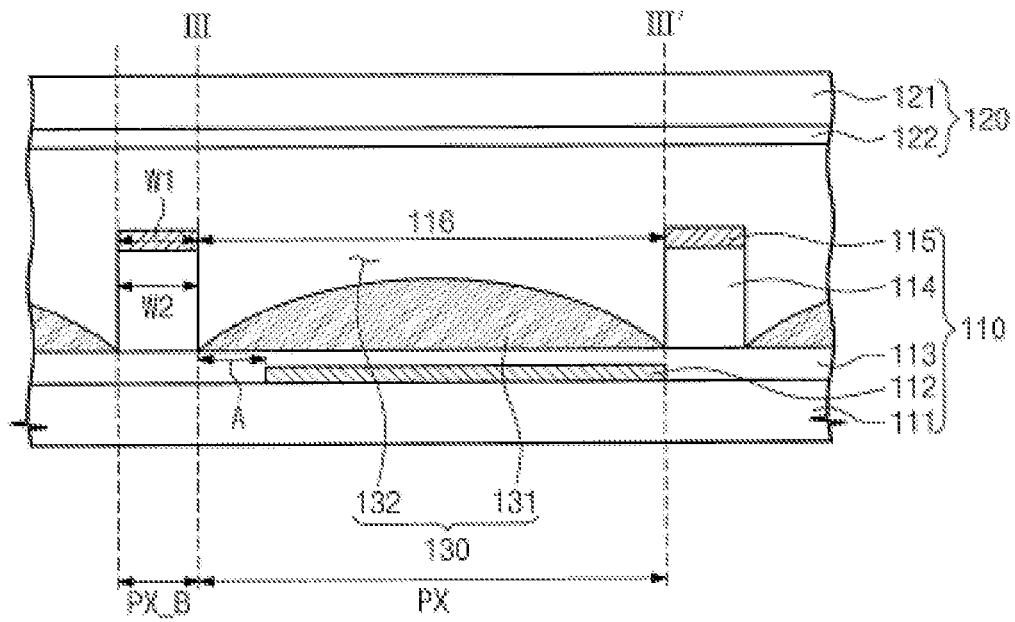
FIGS. 3A and 3B are cross-sectional views taken along a line I-I' shown in FIG. 2.
Figure 3B:
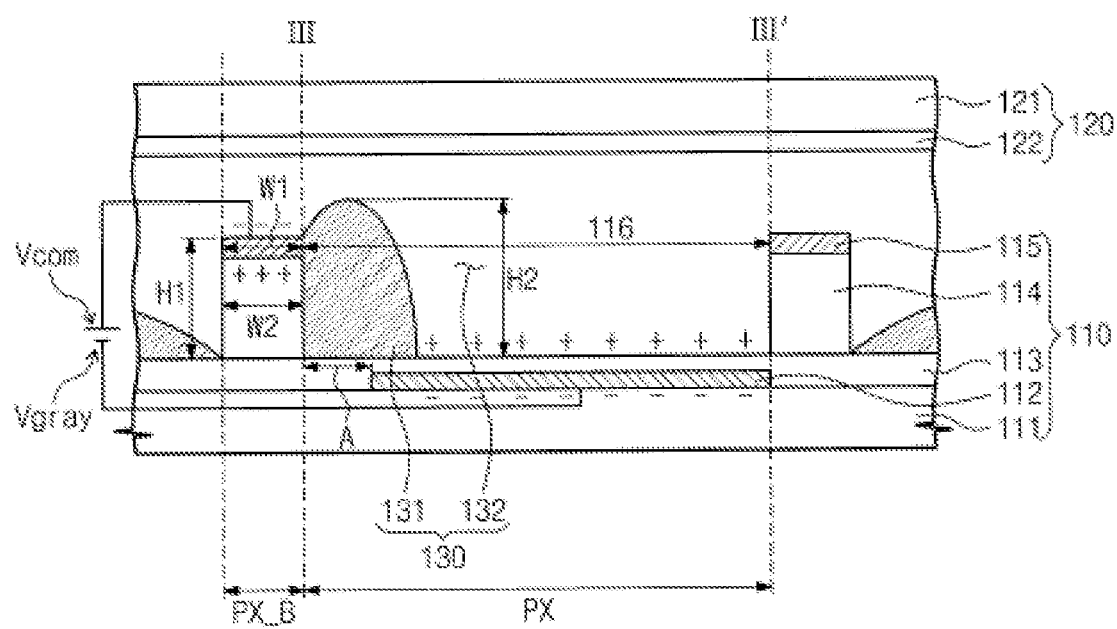

FIGS. 3A and 3B are cross-sectional views taken along a line I-I' shown in FIG. 2.

FIGS. 3A and 3B show only one pixel, but the other pixels have the same configuration as the one pixel shown.

FIG. 3A shows the electrowetting layer 130 when no voltage is applied to the pixel PX. FIG. 3B shows the electrowetting layer 130 when voltage is applied to the pixel PX.

Referring to FIG. 3A, a side area of the pixel PX is defined as an area between two dotted-lines III-III' shown in FIG. 3A. Accordingly, the area in which the pixel PX is formed may be overlapped by the first substrate 110 and the second substrate 120 as shown in FIG. 3A. The configuration of the first and second substrates 110 and 120 is as described above.

The pixel PX includes the first electrode 112 disposed on the first base substrate 111, and a first area A between the partition wall 114 and the first electrode 112. The first area A is a region in which the first electrode 112 is not formed.

An area PX_B between the pixels PX may be defined as a pixel boundary area PX_B, and the partition wall 114 is formed in the pixel boundary area PX_B.

As described above, the width W2 of the partition wall 114 corresponds to the width between two pixels PX adjacent to each other. Thus, as shown in FIG. 3A, the width of the pixel boundary area PX_B between the two pixels PX adjacent to each other may be equal to the width W2 of the partition wall 114.

The second electrode 115 is disposed on the partition wall 114 with the openings 116. As described above, the width W1 of the second electrode 115, which corresponds to the width between the openings 116 adjacent to each other, may be equal to the width W2 of the partition wall 114. Because the second electrode 115 is formed to have the same width as the partition wall 114, the second electrode 115 may be patterned using the same mask as that used to form the partition wall 114. As a result, no additional mask is needed to form the second electrode 115.

The electrowetting layer 130 disposed between the first substrate 110 and the second substrate 120 includes the first fluid 131 and the second fluid 132, which are immiscible with each other. The first fluid 131 has electrical non-conductivity or non-polarity and the second fluid 132 has electrical conductivity or polarity. In addition, the first fluid 131 has hydrophobicity and the second fluid 132 has hydrophilicity. For instance, the first fluid 131 may include an organic solvent, such as, for example, silicon oil, mineral oil, carbon tetrachloride (CCL4), etc. The second fluid 132 may include an aqueous solution and electrolyte, such as, for example, sodium chloride (NaCl).

The first fluid 131 includes a black dye or a light absorbing material to absorb the light incident thereto. In addition, the first fluid 131 is dispersed over the pixel PX or moves to a side portion of the pixel PX so as to serve as a light shutter. The second fluid 132 may be transparent, and thus the second fluid 132 may transmit the light incident thereto.

The first fluid 131 and the second fluid 132 have different polarities from each other, and thus the first fluid 131 and the second fluid 132 are immiscible with, and make contact with, each other. The first fluid 131 is disposed on the insulating layer 113 in the pixel PX partitioned by the partition wall 114, and the second fluid 132 is disposed on the first fluid 131.

As an exemplary embodiment, the first fluid 131 includes a dye representing one of red, green, and blue colors or a material representing one of red, green, and blue colors. In this case, the color filter CF may be removed from the electrowetting display device 100. The movement of the electrowetting layer 130 is controlled by voltages respectively applied to the first electrode 112 and the second electrode 115.

FIG. 3A shows a configuration of a pixel for an electrowetting display device used as a transmission type display device. However, the electrowetting display device 100 may be used as a reflection type display device.

Although not shown in figures, in a case in which the electrowetting display device 500 is used as a reflection type display device, the electrowetting display device 100 may further include a reflective layer configured to include a reflective metal, e.g., aluminum (Al) and/or aluminum-neodymium (AlNd). The reflective layer is disposed on the first electrode 112 or under the first substrate 110. However, the first electrode 112 may include the reflective metal, such as aluminum (Al) to reflect the light. In this case, the electrowetting display device 100 does not include the reflective layer.

When the gray scale voltage is not applied to the first electrode 112, the pixel PX displays a black gray scale because the first fluid 131 covers the insulating layer 113 as shown in FIG. 3A.

Referring to FIG. 3B, the gray-scale voltage Vgray is applied to the first electrode 112, and the common voltage Vcom is applied to the second electrode 115. The gray-scale voltage Vgray applied to the first electrode 112 has a level lower than that of the common voltage Vcom. In this case, the common voltage Vcom may be a positive (+) polarity voltage and the gray scale voltage Vgray may be a negative (−) polarity voltage.

As shown in FIGS. 3A and 3B, a portion of the second fluid 132 makes contact with the second electrode 115. The second fluid 132 is electrically conductive. Accordingly, a portion of the second fluid 132 makes contact with the second electrode 115, and the common voltage Vcom is applied to the second fluid 132 through the second electrode 115. That is, the second fluid 132 disposed in the pixel PX receives the common voltage Vcom through the second electrode 115 formed on the partition wall 114.

In the case that the common voltage Vcom is applied to the second fluid 132 and the first electrode 112 is applied with the gray-scale voltage Vgray having the lower level than the common voltage Vcom, the second fluid 132 is polarized. For example, the first electrode 112 has the negative (−) polarity and the area of the second fluid 132, which is adjacent to the first electrode 112, has the positive (+) polarity. In this case, an attractive force acts between the first electrode 112 having the negative (−) polarity and the area of the second fluid 132 having the positive (+) polarity. Accordingly, the polarized second fluid 132 makes contact with the insulating layer 113, while a surface tension of the second fluid 132 is changed by the attractive force, so that the second fluid 132 pushes out, or displaces, the first fluid 132, which is pushed to a side portion of the pixel PX above first area A in which electrode 112 is not formed.

The first fluid 131 that includes the organic solvent tends to collect, or gather, instead of disperse, in fluid 132 due to the different polarities of the fluids 131 and 132. Accordingly, the first fluid 131 is pushed out, i.e., displaced, to the side portion of the pixel PX by the second fluid 132, and is stably gathered in the side portion of the pixel PX.

For instance, because the pixel electrode 112 is not formed in the first area A of the pixel PX shown in FIG. 3B, the gray-scale voltage Vgray is not applied to the first area A and the electric field is not generated in the first area A. As a result, the first fluid 131 may be displaced towards, and collect (gather) in the area of the pixel PX, which includes the first area A. That is, the first fluid 131 is gathered in the left side portion of the pixel PX. In this case, the light passes through the second fluid 132 now positioned above the first electrode 112, and thus the pixel PX displays a predetermined image.

The amount of the first fluid 131 that is displaced depends on the level difference between the gray-scale voltage Vgray applied to the first electrode 112 and the common voltage Vcom applied to the second electrode 115. For instance, as the level difference between the common voltage Vcom and the gray-scale voltage Vgray increases, the first fluid 131 is increasingly displaced toward, and gathered, in the first area A. The common voltage Vcom has a uniform voltage level, and the gray-scale voltage corresponds to the gray scale displayed in the pixel PX. Thus, the amount of the first fluid 131 displaced may be determined by the level of the gray-scale voltage Vgray applied to the first electrode 112.

The first fluid 131 displaced to the side portion of the pixel PX has a second height H2. As shown in FIG. 3B, the second height H2 of the first fluid 131 may be higher than a first height HI corresponding to a distance between an upper surface of the insulating layer 113 and an upper surface of the second electrode 115. A side surface of the partition wall 114 may be surface-treated using a hydrophobic material while an upper surface of the second electrode 115 may be surface-treated using a hydrophilic material. Thus, although the first fluid 131 has the second height H2 higher than the first height H1, the first fluid 131 has a chemical affinity to the side surface of the partition wall 114, which is higher than a chemical affinity to the upper surface of the partition wall 114. As a result, the first fluid 131 may be prevented from flowing into the adjacent pixel beyond the partition wall 114.

As described above, although the second fluid 132 partially makes contact with the second electrode 115, the common voltage Vcom is applied to the second fluid 132 through the second electrode 115. Thus, the pixel PX may be normally operated.

The second electrode 115 of the electrowetting display device 100 includes the openings 116 respectively positioned corresponding to the positions of the pixels PX, and second electrode 115 is disposed on the partition wall 114. Because the material used to form the second electrode 115 does not exist in the openings 116, the light passes through the openings 116. Accordingly, the electrowetting display device 100 according to the first exemplary embodiment may improve the transmittance of the light.

In addition, because the second electrode is formed on the partition wall 114 of the first substrate 110 without being formed on the second base substrate 121, the process of forming the second substrate 120 may be simplified. In addition, the second electrode 115 is formed to have the same width as the width of the partition wall 114, so the second electrode 115 is patterned by using the same mask as the partition wall 114. Therefore, no additional mask is required to form the second electrode 115.

Figure 4:
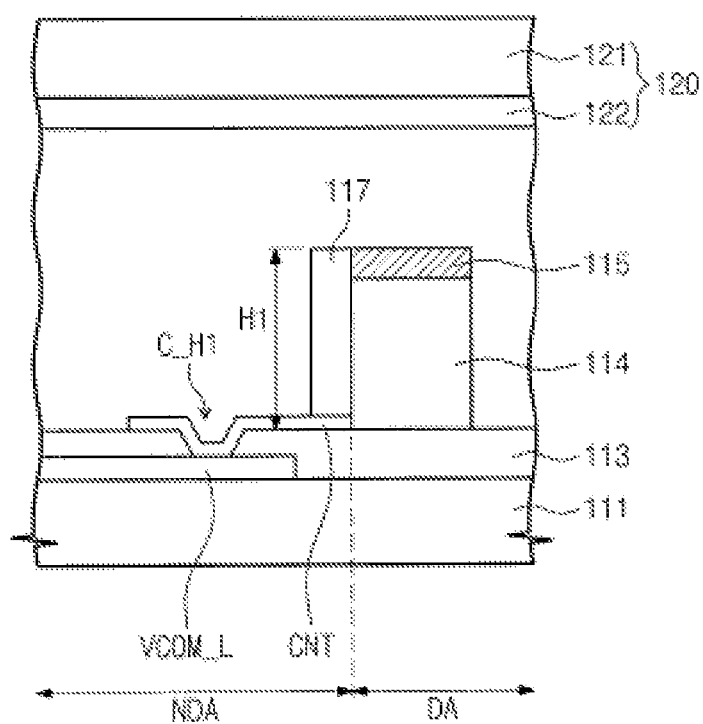
FIG. 4 is a cross-sectional view taken along a line II-II' shown in FIG. 2.

FIG. 4 is a cross-sectional view taken along a line 11-11' shown in FIG. 2.

Referring to FIG. 4, the non-display area NDA includes the common voltage line VCOM_L, a connection electrode CNT, and a third electrode 117.

In more detail, the common voltage line VCOM_L is disposed on the first base substrate 111 in the non-display area NDA to receive the common voltage Vcom. In addition, the insulating layer 113 is disposed on the first base substrate 111 to cover the common voltage line VCOM_L.

The connection electrode CNT is electrically connected to the common voltage line VCOM_L through a first contact hole C_H1 formed through the insulating layer 113. The third electrode 117 is formed in the predetermined area of the outermost side surface of the partition wall 114. The outermost side surface of the partition 114 may be an outermost side surface of the display area NDA.

A lower surface of the third electrode 117 makes contact with the connection electrode CNT, and thus the third electrode 117 is electrically connected to the connection electrode CNT. In addition, the third electrode 117 may have the first height H1, which is the height at which the second electrode 115 is formed. Accordingly, the upper side surface of the third electrode 117 makes contact with the side surface of the second electrode 115, so that the third electrode 117 is electrically connected to the second electrode 115.

The third electrode 117 may be formed of a transparent conductive material, e.g., indium tin oxide, as the second electrode 115. In addition, the third electrode 117 may be formed of a conductive material containing silver, e.g., a silver paste. In the case that the third electrode 117 is formed of the silver paste, the silver paste is coated onto the predetermined area of the outermost side surface of the partition wall 114, in which the third electrode 117 is formed, and cured.

Due to the above-mentioned configuration, the common voltage Vcom applied to the common voltage line VCOM_L may be applied to the second electrode 115 formed on the partition wall 114 through the connection electrode CNT and the third electrode 117.

Figure 5:
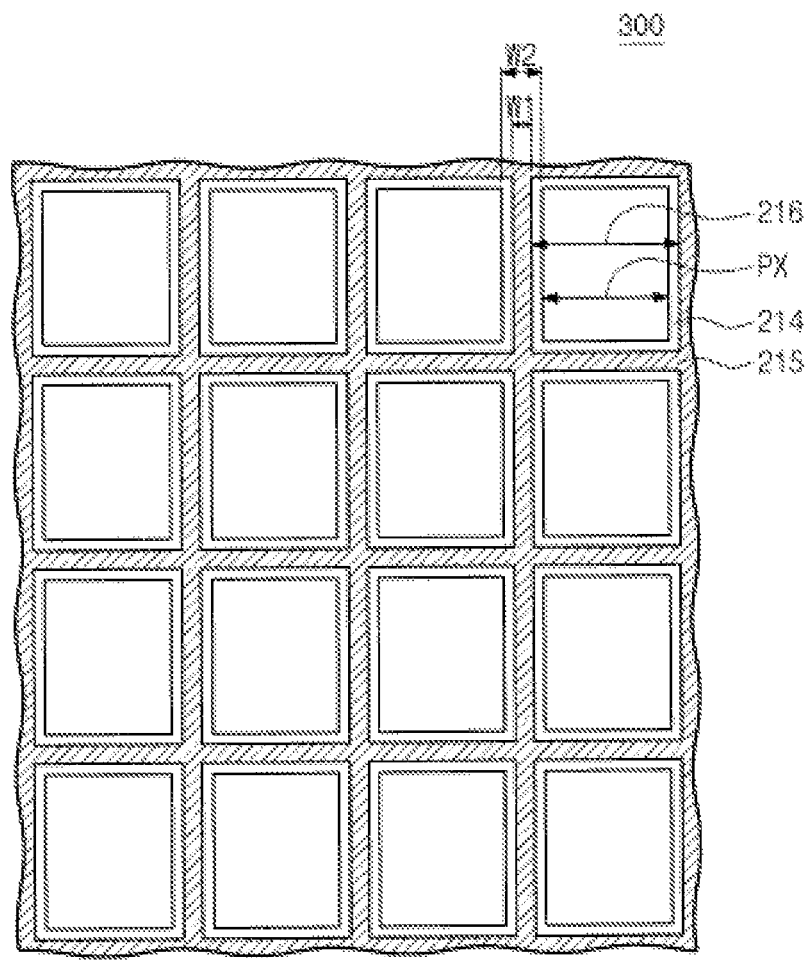
FIG. 5 is a plan view showing an electrowetting display device according to a second exemplary embodiment.
Figure 6:
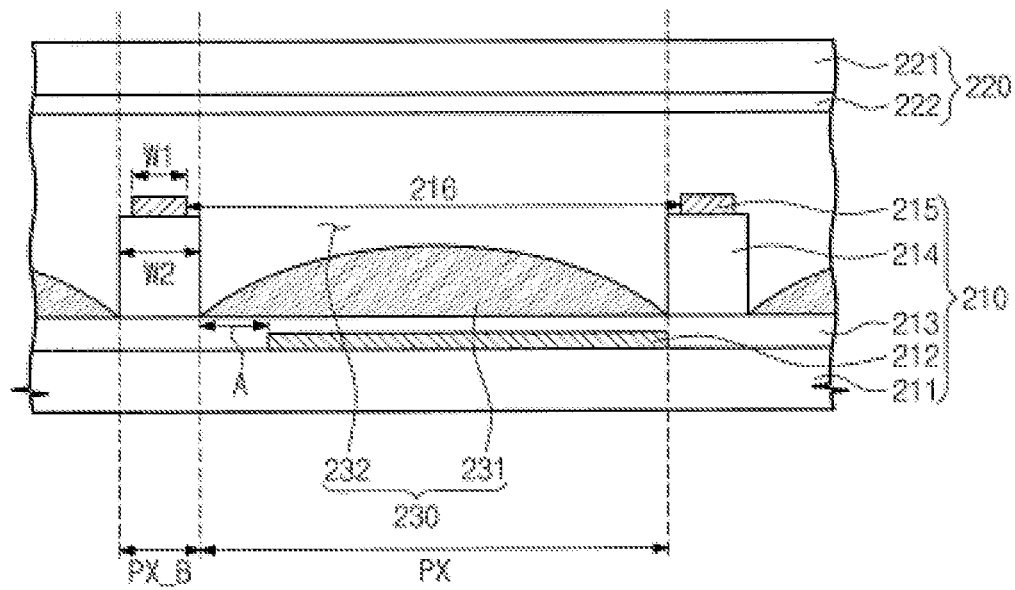
FIG. 6 is a cross-sectional view showing a pixel shown in FIG. 5.

FIG. 5 is a plan view showing an electrowetting display device according to a second exemplary embodiment and FIG. 6 is a cross-sectional view showing a pixel shown in FIG. 5.

The electrowetting display device 200 in FIGS. 5 and 6 have the same configuration as that of the electrowetting display device 100 in FIGS. 1 to 4 except for the width of the partition wall and the width of the second electrode. Accordingly, the configurations of the electrowetting display device 200 that are different from the electrowetting display device 100 will be mainly described.

Referring to FIGS. 5 and 6, the electrowetting display apparatus 300 includes a second electrode 215 is disposed on the partition wall 214 and includes openings 216 positioned corresponding to the positions of pixels PX. The second electrode 215 has a width W1 corresponding to a width between two openings 216 adjacent to each other. The partition wall 214 has a width W2 corresponding to a width between two pixels PX adjacent to each other. The width WI of the second electrode 215 may be smaller than the width W2 of the partition wall 214.

As shown in FIG. 6, a portion of the second fluid 232 makes contact with the second electrode 215. The second fluid 232 is electrically conductive. Accordingly, a portion of the second fluid 232 makes contact with the second electrode 215, and the common voltage Vcom is applied to the second fluid 232 through the second electrode 215. That is, the second fluid 232 disposed in the pixel PX receives the common voltage Vcom through the second electrode 215 formed on the partition wall 214.

The other elements of the electrowetting display device 200 have the same configurations as those of the electrowetting display device 100 according to the first exemplary embodiment, and thus detailed descriptions of such other elements of the electrowetting display device 200 will be omitted.

The second electrode 215 of the electrowetting display device 200 is disposed on the partition wall 214 and includes the openings 216 positioned to correspond respectively to the position of the pixels PX. Because the second electrode 215 is not formed in the openings 216, light passes through the openings 216. Thus, the electrowetting display device 200 may improve the transmittance of the light.

Figure 7A:
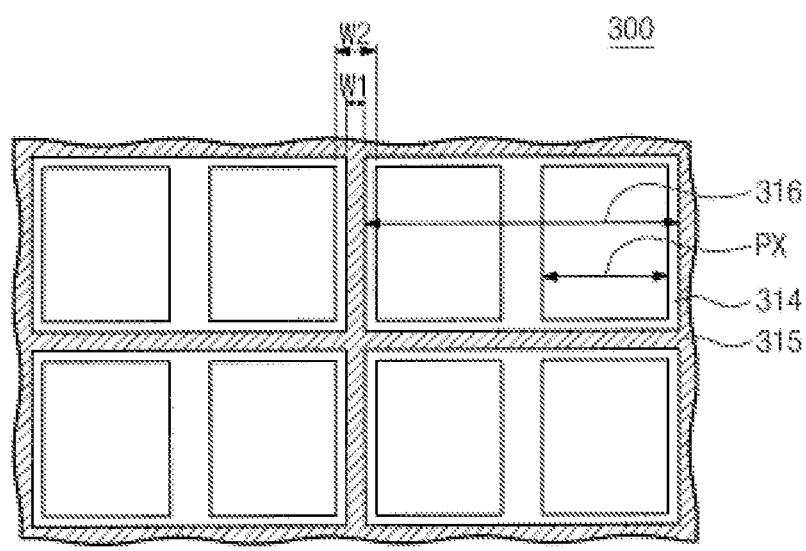
Figure 7B:
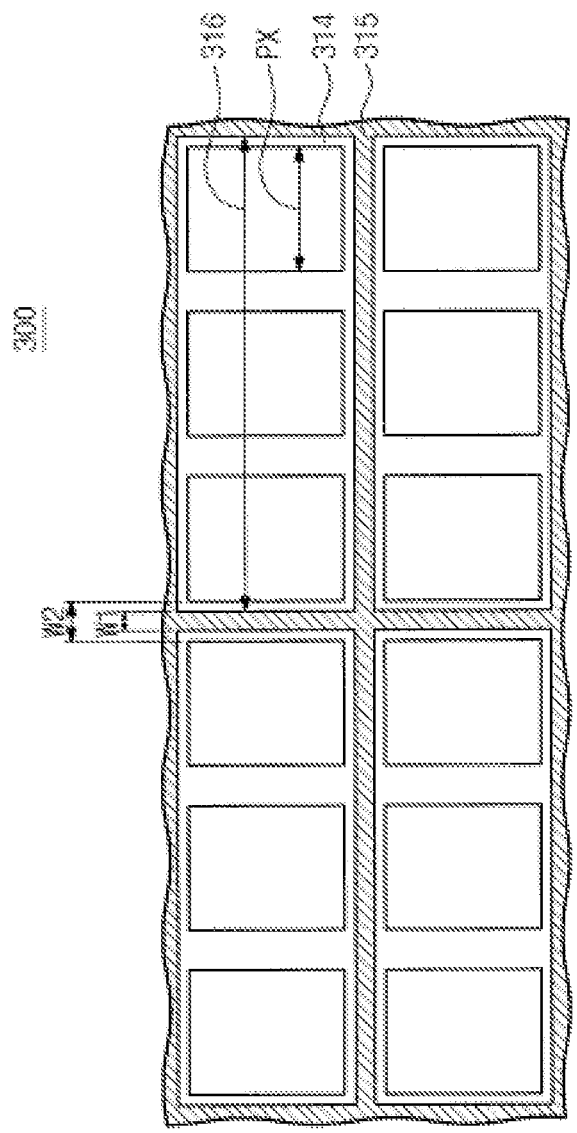

FIGS. 7A to 7C are plan views showing an electrowetting display device according to a third exemplary embodiment.

The electrowetting display device 300 according to the third exemplary embodiment have the same configuration as that of the electrowetting display device 100 according to the second exemplary embodiment except for a configuration of the openings. Accordingly, the configuration of the openings for the electrowetting display device 300 will be mainly described.

Referring to FIGS. 7A to 7C, a second electrode 315 of the electrowetting display device 300 includes openings 316. As described above, the pixels PX are arranged in n rows by m columns. In addition, although not shown in FIGS. 7A to 7C, an area between the pixels PX may be defined as a pixel boundary area. A partition wall 314 is disposed in the pixel boundary area and the second electrode 315 is disposed on the partition wall 314.

Each of the openings 316 is positioned to correspond to, i.e., surround, two or more, but less than m, pixels PX arranged in each row. That is, the second electrode 315 is disposed on the partition wall 314 formed in the pixel boundary area between the pixel units each includes two or more, but less than m, pixels PX.

In detail, as shown in FIG. 7A, the second electrode 315 is disposed on the partition wall 314 and includes the openings 316 each of which corresponds to the pixel units each having two pixels PX arranged in each row. That is, the second electrode 315 is disposed on the partition wall 314 formed in the pixel boundary area between the pixel units each having two pixels PX in each row.

In addition, as shown in FIG. 7B, the second electrode 315 may include the openings 316 each of which corresponds to the pixel units each having three pixels PX arranged in each row. That is, the second electrode 315 may be disposed on the partition wall 314 formed in the pixel boundary area between the pixel units each having three pixels PX in each row.

Further, as shown in FIG. 7C, the second electrode 315 may include the openings 316 each of which corresponds to the pixel units each having m pixels PX arranged in each row. That is, the second electrode 315 may be disposed on the partition wall 314 formed in the pixel boundary area between the pixel units each having m pixels PX in each row. The structure shown in FIG. 7C may be called a stripe structure.

Although not shown in figures, the second electrode 315 may include the openings 316 each of which corresponds to, i.e., surrounds, the pixel units each having four pixels PX arranged in each row.

However, the configuration of the openings 316 should not be limited to the above-mentioned structures. For instance, although not shown in FIGS. 7A to 7C, the second electrode 315 may include the openings 316 each of which corresponds to, i.e., surrounds, the pixel units each having two pixels PX arranged in each row and the openings 316 each of which corresponds to the pixel units each having three pixels PX arranged in each row.

In addition, the second electrode 315 may include the openings 316 each of which corresponds to the pixel units each having two pixels PX arranged in each row and the openings 316 each of which corresponds to the pixel units each having m−2 pixels PX arranged in each row. In this case, the "m" is an integer number greater than 4 and the second electrode 315 may include two openings 316.

Although not shown in FIGS. 7A to 7C, the openings 316 of the second electrode 315 may respectively correspond to the pixel units each having two or more but less than n pixels PX arranged in each row.

As shown in FIGS. 7A to 7C, the width WI of the second electrode 315, which corresponds to the width between two openings 316 adjacent to each other, may be smaller than the width W2 of the partition wall 314 between two pixels PX adjacent to each other. However, it should not be limited thereto or thereby. As with the configuration of the electrowetting display device 100 according to the first exemplary embodiment, the width W1 of the second electrode 315 may be equal to the width W2 of the partition wall 314.

Although not shown in figures, a portion of the second fluid of the electrowetting display device may contact the second electrode 315. The second fluid has the electrical conductivity. Accordingly, the second fluid disposed in the pixel PX may receive the common voltage Vcom through the second electrode 315 formed on the partition wall 314. That is, as described with reference to FIGS. 3A and 3B, the pixel PX may be operated.

Consequently, because the second electrode 315 of the electrowetting display device 300 according to the third exemplary embodiment includes the openings 316, the transmittance of the light may be improved.

Figure 8A:
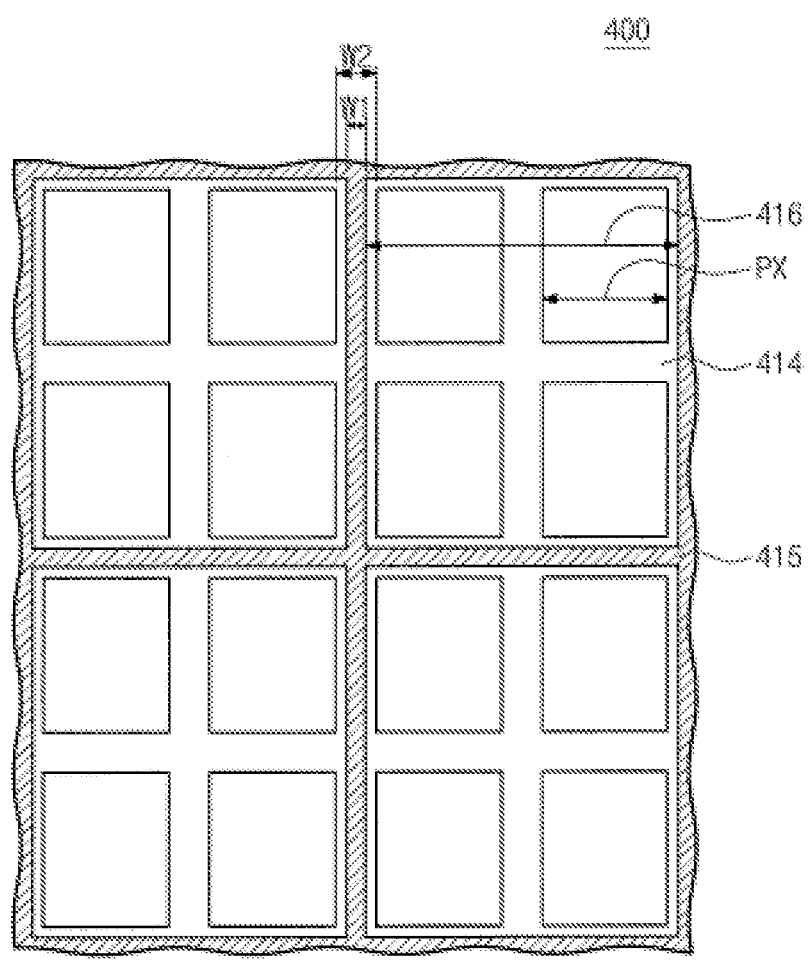
FIGS. 8A to 8C are plan views showing an electrowetting display device according to a fourth exemplary embodiment.
Figure 8B:
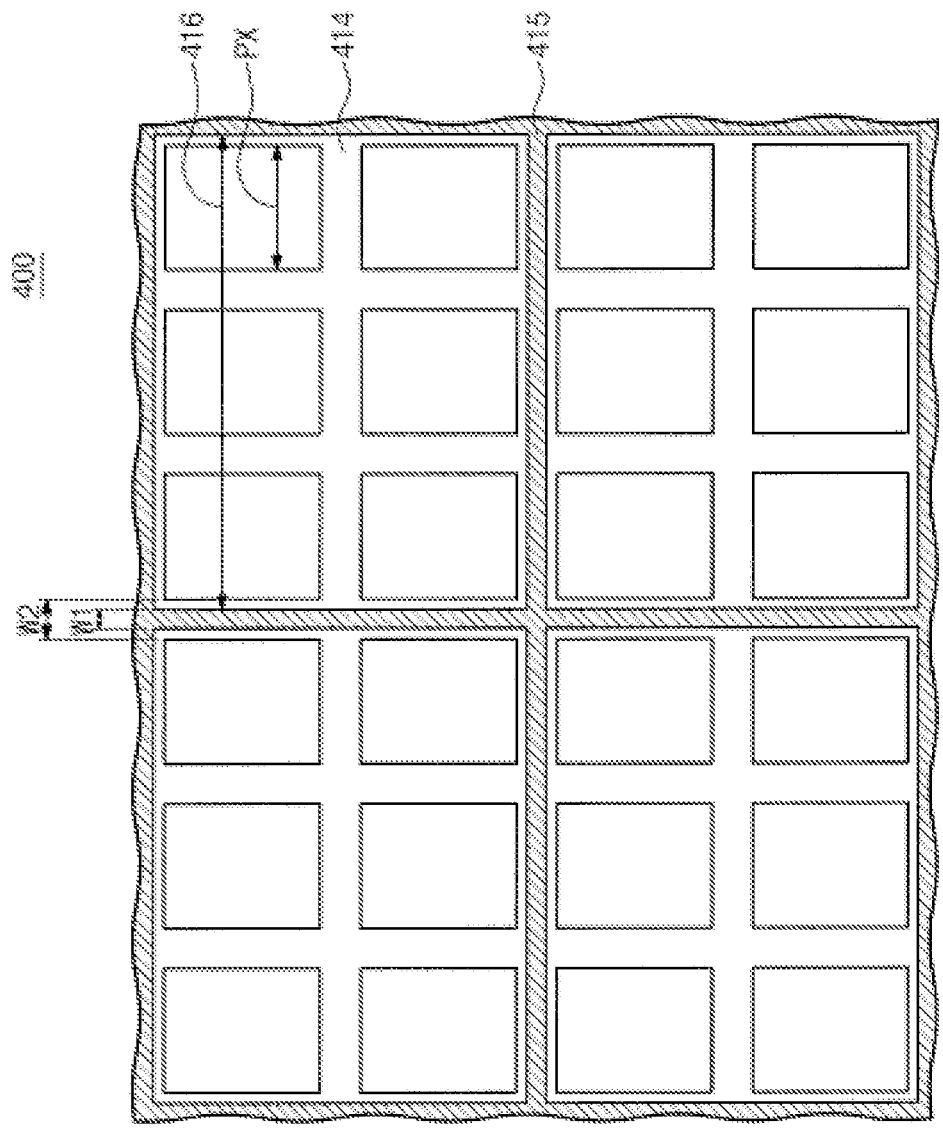
Figure 8C:
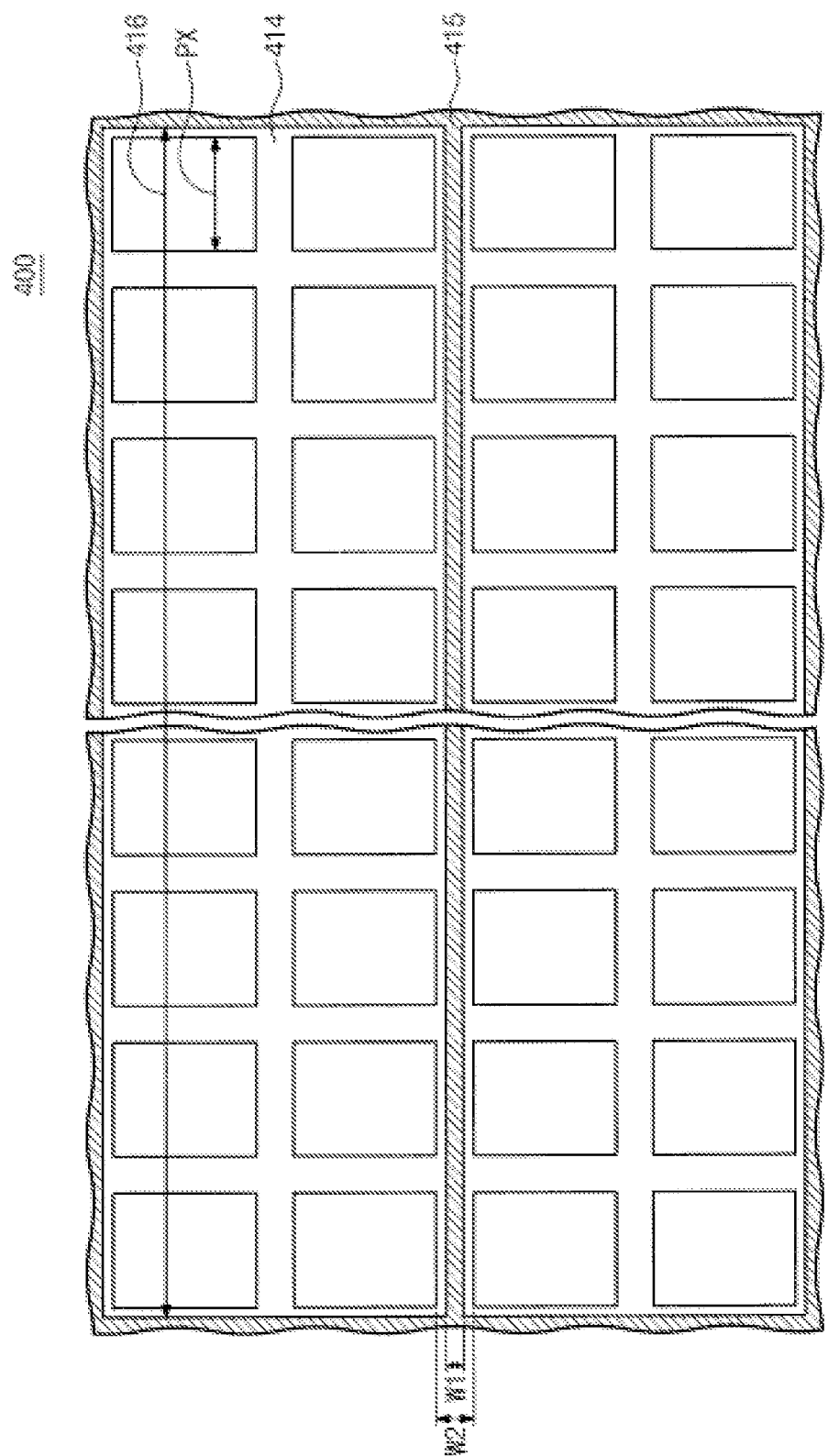

FIGS. 8A to 8C are plan views showing an electrowetting display device according to a fourth exemplary embodiment.

The electrowetting display device 400 according to the fourth exemplary embodiment have the same configuration as that of the electrowetting display device 200 according to the second exemplary embodiment except for a configuration of openings. Accordingly, the configuration of the openings of the electrowetting display device 400 will be mainly described.

Referring to FIGS. 8A to 8C, a second electrode 415 of the electrowetting display device 400 includes openings 416. As described above, the pixels PX are arranged in n rows by m columns. In addition, although not shown in FIGS. 8A to 8C, an area between the pixels PX may be defined as a pixel boundary area. A partition wall 414 is disposed in the pixel boundary area, and the second electrode 415 is disposed on the partition wall 414.

Each of the openings 416 corresponds to, i.e., surrounds, pixels PX arranged in two column units and two or more row units. That is, the second electrode 415 is disposed on the partition wall 414 formed in the pixel boundary area between the pixel units each including the pixels PX arranged in two row units by two or more column units.

For instance, as shown in FIG. 8A, the second electrode 415 is disposed on the partition wall 414 and includes openings 416 respectively corresponding to, i.e., surrounding, the pixel units each including four pixels PX arranged in two rows by two columns. That is, the second electrode 415 is disposed on the partition wall 414 formed in the pixel boundary area between the pixel units each including the four pixels PX arranged in two rows by two columns.

In addition, as shown in FIG. 8B, the second electrode 415 is disposed on the partition wall 414 and includes openings 416 respectively corresponding to, i.e., surrounding, the pixel units each including six pixels PX arranged in two rows by three columns. That is, the second electrode 415 is disposed on the partition wall 414 formed in the pixel boundary area between the pixel units each including the six pixels PX arranged in two rows by three columns.

Further, as shown in FIG. 8C, the second electrode 415 is disposed on the partition wall 414 and includes openings 416 respectively corresponding to the pixel units each including pixels PX arranged in two rows by m columns. That is, the second electrode 415 is disposed on the partition wall 414 formed in the pixel boundary area between the pixel units each including the pixels PX arranged in two rows by m columns. The structure shown in FIG. 8C may be called a stripe structure.

Although not shown in figures, the second electrode 415 may include the openings 316 each of which corresponds to the pixel units each having the pixels PX arranged in two rows by m or more columns.

However, the configuration of the openings 416 should not be limited to the above-mentioned structures. For instance, although not shown in FIGS. 8A to 8C, the second electrode 415 may include the openings 416 each of which corresponds to the pixel units each having four pixels PX arranged in two rows by two columns and the openings 316 each of which corresponds to the pixel units each having six pixels PX arranged in two rows by three columns.

In addition, the second electrode 415 may include the openings 416 each of which corresponds to the pixel units each having four pixels PX arranged in two rows by two columns and the openings 316 each of which corresponds to the pixel units each having pixels PX arranged in two rows by m−2 columns. In this case, the "m" is an integer number greater than four and the second electrode 415 may include two openings 416.

Although not shown in FIGS. 8A to 8C, the openings 416 of the second electrode 415 may respectively correspond to the pixel units each having pixels PX arranged in two columns by two or more but n or less rows.

As shown in FIGS. 8A to 8C, the width W1 of the second electrode 415, which corresponds to the width between two openings 416 adjacent to each other, may be smaller than the width W2 of the partition wall 414 between two pixels PX adjacent to each other. However, it should not be limited thereto or thereby. As with the configuration of the electrowetting display device 100 according to the first exemplary embodiment, the width W1 of the second electrode 415 may be equal to the width W2 of the partition wall 414.

Although not shown in figures, a portion of the second fluid of the electrowetting display device may make contact with the second electrode 415. The second fluid is electrically conductive. Accordingly, the second fluid disposed in the pixel PX may receive the common voltage Vcom through the second electrode 415 formed on the partition wall 114. That is, as described with reference to FIGS. 3A and 3B, the pixel PX may be operated.

Consequently, because the second electrode 415 of the electrowetting display device 400 according to the fourth exemplary embodiment includes the openings 416, the transmittance of the light may be improved.

Although the exemplary embodiments have been described, it is understood that the present invention should not be limited to these exemplary embodiments but various changes and modifications can be made by one ordinary skilled in the art within the spirit and scope of the present disclosure, including the claims.

What is claimed is:

1. An electrowetting display device comprising:
   a plurality of first electrodes disposed on a first base substrate, wherein each first electrode is positioned to correspond, respectively, to a position of one of a plurality of pixels;
   a partition wall disposed on the first base substrate, wherein the partition wall comprises a plurality of intersecting partition wall portions to thereby partition individual pixels of the plurality of pixels;
   a second electrode disposed on the partition wall, the second electrode including a plurality of openings, wherein each opening corresponds to a position of one or more pixels of the plurality of pixels;
   a second base substrate facing the first base substrate; and
   an electrowetting layer disposed between the first base substrate and the second base substrate, wherein the electrowetting layer is configured to move in response to voltages applied to the first electrodes and the second electrode.

2. The electrowetting display device of claim 1, wherein the second electrode has a width between two adjacent openings equal to a width of a portion of the partition wall defining two adjacent pixels.

3. The electrowetting display device of claim 1, wherein the second electrode has a width between two adjacent openings adjacent smaller than a width of a portion of the partition wall between two adjacent pixels.

4. The electrowetting display device of claim 1, wherein each of the openings is respectively positioned to correspond to a position of a single corresponding pixel.

5. The electrowetting display device of claim 1, wherein the pixels are arranged in n rows by m columns and the openings of the second electrode respectively correspond to positions of corresponding pixel units, and wherein each pixel unit includes two or more pixels but less than m pixels arranged in each row.

6. The electrowetting display device of claim 5, wherein the openings respectively correspond to positions of the corresponding pixel units, and wherein each pixel unit includes two pixels arranged in each row.

7. The electrowetting display device of claim 5, wherein the openings respectively correspond to positions of the corresponding pixel units, and wherein each pixel unit includes three pixels arranged in each row.

8. The electrowetting display device of claim 5, wherein the openings respectively correspond to positions of the corresponding pixel units, and wherein each pixel unit includes m pixels arranged in each row.

9. The electrowetting display device of claim 1, wherein the first base substrate comprises a display area and a non-display area, wherein the display area comprises the partition wall and the second electrode disposed on the partition wall, wherein the non-display area comprises a common voltage line disposed on the first base substrate, and wherein the non-display area further comprises a third electrode disposed on an outermost side surface of the partition wall to electrically connect the second electrode and the common voltage line.

10. The electrowetting display device of claim 9, wherein the third electrode comprises a silver paste.

11. The electrowetting display device of claim 9, wherein the second electrode comprises a transparent conductive material and the third electrode comprises a transparent conductive material that is the same as the transparent conductive material of the second electrode.

12. The electrowetting display device of claim 9, wherein the non-display area further comprises:
   an insulating layer disposed on the first base substrate to cover the common voltage line; and
   a connection electrode electrically connected between the third electrode and the common voltage line through a contact hole formed through the insulating layer.

13. The electrowetting display device of claim 12, wherein the third electrode has a height corresponding to a distance between (i) an upper surface of the insulating layer and (ii) an upper surface of the second electrode in order to make contact with the second electrode.

14. The electrowetting display device of claim 1, wherein the pixels are arranged in n rows by m columns and the openings of the second electrode respectively correspond to positions of corresponding pixel units, and wherein each pixel unit includes pixels arranged in two rows of pixels by two or more columns of pixels, but m or less columns.

15. The electrowetting display device of claim 14, wherein the openings respectively correspond to positions of the corresponding pixel units, and wherein each pixel unit includes four pixels arranged in two rows by two columns.

16. The electrowetting display device of claim 14, wherein the openings respectively correspond to the corresponding pixel units, and wherein each pixel unit includes six pixels arranged in two rows by three columns.

17. The electrowetting display device of claim 16, wherein the openings respectively correspond to the corresponding pixel units, and wherein each pixel unit includes the pixels arranged in two rows by m columns.

18. The electrowetting display device of claim 1, further comprising an insulating layer disposed on the first base substrate to cover the first electrodes, and wherein the partition wall is disposed on the insulating layer.

19. The electrowetting display device of claim 18, wherein the electrowetting layer comprises:
   a first fluid having at least one of (i) an electrical non-conductivity and (ii) a non-polarity; and
   a second fluid immiscible with the first fluid and having at least one of (i) an electrical conductivity and (ii) a polarity, and the second fluid is disposed on the insulating layer and accommodated within a space defined by the partition wall.

20. The electrowetting display device of claim 19, wherein the second fluid is polarized by (i) a gray-scale voltage applied to the first electrodes and (ii) a common voltage applied to the second electrode, and wherein the second fluid contacts the insulating layer to push the first fluid to a side portion of the pixels.

* * * * *